United States Patent
Sakai et al.

(10) Patent No.: US 10,627,221 B2
(45) Date of Patent: Apr. 21, 2020

(54) MEASUREMENT METHOD AND MEASUREMENT PROGRAM

(71) Applicant: MITUTOYO CORPORATION, Kanagawa (JP)

(72) Inventors: Hiroshi Sakai, Kanagawa (JP); Tomonori Goto, Hokkaido (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 15/439,019

(22) Filed: Feb. 22, 2017

(65) Prior Publication Data
US 2017/0248409 A1    Aug. 31, 2017

(30) Foreign Application Priority Data

Feb. 25, 2016  (JP) .................................. 2016-034825
Dec. 20, 2016  (JP) .................................. 2016-246801

(51) Int. Cl.
*G01B 11/24*    (2006.01)
(52) U.S. Cl.
CPC ...... *G01B 11/2441* (2013.01); *G01B 2210/52* (2013.01)
(58) Field of Classification Search
CPC .................. G01B 11/2441; G01B 2210/52
See application file for complete search history.

(56) References Cited

U.S. PATENT DOCUMENTS

| 5,166,820 A | * | 11/1992 | Fujita | ..................... G01B 11/00 235/462.35 |
| 5,237,404 A |  | 8/1993 | Tanaka et al. | |
| 5,400,132 A | * | 3/1995 | Trepagnier | ............. B23K 26/04 219/121.78 |

(Continued)

FOREIGN PATENT DOCUMENTS

| CN | 1963376 | 5/2007 |
| JP | 2011-191118 | 9/2011 |

(Continued)

OTHER PUBLICATIONS

U.S. Appl. No. 15/440,118 to Hiroshi Sakai et al., filed Feb. 23, 2017.

(Continued)

*Primary Examiner* — Michael A Lyons
(74) *Attorney, Agent, or Firm* — Greenblum & Bernstein, P.L.C.

(57) ABSTRACT

According to an embodiment of the present invention, a method of measuring a shape based on reflected light from a surface of an object irradiated with light from a measurement head, includes: acquiring a first measurement result by setting a measurement condition suitable for the measurement of a first region of the object and by measuring a first scanning range of the surface with a first scanning pitch; determining a second region of the surface except the first region from the first measurement result; and acquiring a second measurement result by setting a measurement condition suitable for the measurement of the second region and (Continued)

by measuring a second scanning range of the surface narrower than the first scanning range with a second scanning pitch finer than the first scanning pitch.

7 Claims, 9 Drawing Sheets

(56) References Cited

U.S. PATENT DOCUMENTS

| | | | | |
|---|---|---|---|---|
| 5,471,303 | A | * | 11/1995 | Ai .................. G01B 11/2441 356/497 |
| 8,891,090 | B2 | | 11/2014 | Nagahama et al. |
| 2004/0240754 | A1 | * | 12/2004 | Smith .................. G01B 11/00 382/286 |
| 2006/0146342 | A1 | | 7/2006 | Doerband et al. |
| 2006/0215177 | A1 | | 9/2006 | Doerband |
| 2011/0222069 | A1 | | 9/2011 | Nagahama et al. |
| 2013/0188198 | A1 | * | 7/2013 | Suenaga ............ G01B 11/2441 356/511 |
| 2014/0152794 | A1 | * | 6/2014 | Takahashi .............. G01B 11/24 348/79 |
| 2014/0283591 | A1 | | 9/2014 | Takahashi et al. |
| 2015/0176967 | A1 | | 6/2015 | Okabe et al. |
| 2017/0178980 | A1 | | 6/2017 | Owen et al. |

FOREIGN PATENT DOCUMENTS

| | | |
|---|---|---|
| JP | 2015-045575 | 3/2015 |
| JP | 2015-118076 | 6/2015 |

OTHER PUBLICATIONS

Office Action issued in U.S. Appl. No. 15/440,118 dated Oct. 5, 2018.

Chinese Office Action issued in Chinese Patent Application No. 201710085875.X dated Sep. 20, 2019, along with a corresponding English machine translation.

\* cited by examiner

MEASUREMENT METHOD AND MEASUREMENT PROGRAM

CROSS-REFERENCE TO RELATED APPLICATION

This non-provisional application claims priority under 35 U.S.C. § 119(a) from Japanese Patent Application No. 2016-034825, filed on Feb. 25, 2016, and Japanese Patent Application No. 2016-246801, filed on Dec. 20, 2016, the entire contents of which are incorporated herein by reference.

BACKGROUND

Technical Field

The present invention relates to a measurement method and a measurement program. More specifically, the invention relates to a measurement method and a measurement program, capable of measuring the shape of a surface of an object including regions having a different optimum measurement condition, with high preciseness in a short time.

Related Art

Light interferometry that uses brightness information of interference fringes occurring due to optical interference, has been known as one of methods of measuring the surface height, the surface roughness, and the three-dimensional shape of a measuring object. The light interferometry uses an increase of the brightness of interference fringes due to superposition and composition of peaks of the interference fringes between wavelengths at a focus at which the optical path length of a reference optical path and the optical path length of a measurement optical path correspond to each other. Therefore, an image pickup element, such as a CCD camera, captures an interference image indicating a two-dimensional distribution of the intensity of interference light, with the optical path length of the reference optical path or the measurement optical path, being varied, in the light interferometry. By detecting a focused position at which the intensity of the interference light has a peak at the respective measurement positions within a capturing field of view, it is possible to measure the height of a measurement surface in a corresponding measurement position and thus a three-dimensional shape or the like of the measuring object (e.g., refer to JP 2011-191118 A, JP 2015-045575 A, and JP 2015-118076 A).

SUMMARY OF THE INVENTION

Here, when the surface of the measuring object includes regions each having a different optimum measurement condition, the entirety cannot be measured with high preciseness under only one measurement condition. For example, when measurement is performed with a light intensity optimum to a surface portion of the object including a recess (the surface having a step, such as a pit or a groove) on the surface, the shape of the recess is barely detected because the light does not reach in the recess or the light intensity that reaches is small. Meanwhile, when the light intensity increases, the shape of the recess can be detected, but the light reflected on the surface portion is saturated so that the shape of the surface cannot be accurately measured.

When such an object is measured, a so-called multi-scanning measurement that measures under a condition optimum to the surface portion, additionally measures under a condition optimum to the recess, and then composites both measurement results, is performed. However, the method requires a long time for two times of measurement in order to acquire one measurement result for the object.

An object of the present invention is to provide a measurement method and a measurement program, capable of measuring the shape of a surface of an object including regions each having a different optimum measurement condition, in a short time.

In order to solve the problem, according to an embodiment of the present invention, a method of measuring a shape based on reflected light from a surface of an object irradiated with light from a measurement head, includes: acquiring a first measurement result by setting a measurement condition suitable for the measurement of a first region of the object and by measuring a first scanning range of the surface with a first scanning pitch; determining a second region of the surface from the first measurement result; and acquiring a second measurement result by setting a measurement condition suitable for the measurement of the second region and by measuring a second scanning range of the surface narrower than the first scanning range with a second scanning pitch finer than the first scanning pitch.

With this configuration, in the measurement of the first scanning range with the first scanning pitch, coarse data of the surface of the object is acquired, and thereby the measurement suitable for the first region is mainly performed. In the measurement of the second scanning range with the second scanning pitch, fine data is acquired in a range of the surface of the object narrower than the first scanning range, and thereby the measurement suitable for the second region is mainly performed. Accordingly, both of the first region and the second region can be measured with sufficient preciseness in a short time. Note that, the second region can be a region of the surface except the first region.

In the measurement method according to the embodiment of the present invention, the determining the second region may include assuming a surface reference position based on measurement data of only the second region from the first measurement result, and the acquiring the second measurement result may include setting the second scanning range including the surface reference position that has been assumed, the second scanning range excluding at least a bottom of a recess recessed lower than a lowest position of the surface reference position. Accordingly, the second scanning range that requires long measurement time can be effectively set.

In the measurement method according to the embodiment of the present invention, the first region may have the recess recessed with respect to the surface. Accordingly, the recess in the first region and a surface portion in the second region can be measured with sufficient preciseness in a short time.

The measurement method according to the embodiment of the present invention, may further include compositing data of the first region acquired from the first measurement result and data of the second region acquired from the second measurement result. Accordingly, the entire-shape data of the surface of the object can be acquired.

According to the embodiment of the present invention, a non-transitory computer-readable recording medium that stores a measurement program for measuring a shape based on reflected light from a surface of an object irradiated with light from a measurement head, when executed by a computer causes the computer to function as: a unit configured to set a measurement condition suitable for the measurement of a first region of the object, configured to measure a first scanning range of the surface with a first scanning pitch, and configured to acquire a first measurement result; another unit configured to determine a second region of the surface from the first measurement result; and still another unit configured to set a measurement condition suitable for the measurement of the second region, configured to measure a second scanning range of the surface narrower than the first scanning range with a second scanning pitch finer than the first scanning pitch, and configured to acquire a second measurement result.

With this configuration, coarse data of the surface of the object is acquired, and the measurement suitable for the first region is mainly performed, in the measurement of the first scanning range with the first scanning pitch, in the measurement with the computer. Fine data is acquired in a range of the surface of the object narrower than the first scanning range, and the measurement suitable for the second region is mainly performed, in the measurement of the second scanning range with the second scanning pitch. Accordingly, both of the first region and the second region can be measured with sufficient preciseness in a short time.

DETAILED DESCRIPTION OF THE EMBODIMENTS

An embodiment of the present invention will be described below based on the drawings. Note that, the same members are denoted with the same reference signs and the descriptions of members that have been described once will be appropriately omitted, in the following descriptions.

(Entire Configuration of Measurement Apparatus)

Figure 1:
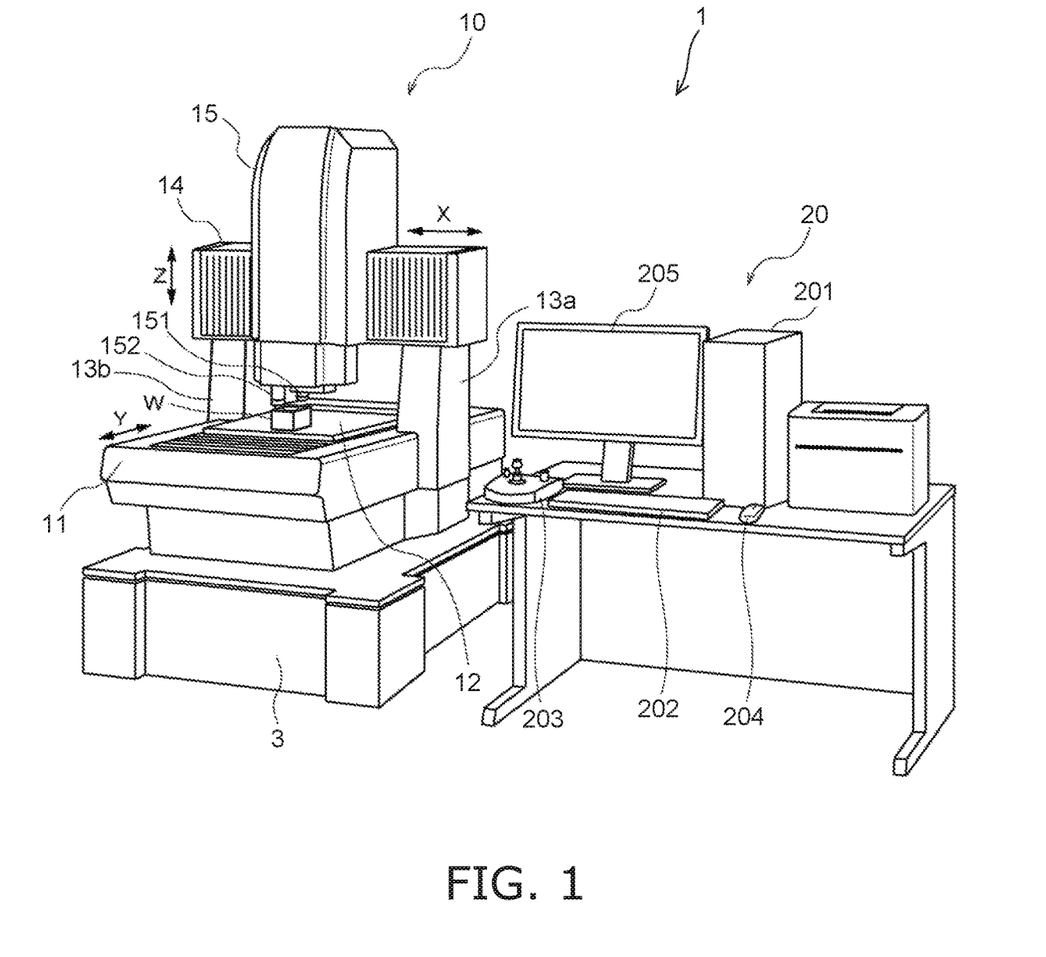
FIG. 1 is a view of an entire configuration of an image measurement apparatus according to the present embodiment.

FIG. 1 is a view of a measurement apparatus according to the present embodiment, more specifically, an entire configuration of an image measurement apparatus.

As illustrated in FIG. 1, the image measurement apparatus 1 according to the present embodiment includes an apparatus body 10 that measures the shape of an object W, and a computer system 20 that controls the apparatus body 10 and additionally performs necessary data processing. Note that, the image measurement apparatus 1 may appropriately include, for example, a printer that prints a measurement result, other than the body and the system. The image measurement apparatus 1 according to the present embodiment is suitable for the measurement of the object W having a curved shape, such as an inner wall of a cylinder.

The apparatus body 10 includes a mount 11, a stage 12, an X-axis guide 14, and an imaging unit 15. According to the present embodiment, a direction of an X-axis (a direction along the X-axis) is one direction along a face of the stage 12. A direction of a Y-axis (a direction along the Y-axis) is along the face of the stage 12 and is orthogonal to the direction of the X-axis. A direction of a Z-axis (a direction along the Z-axis) is orthogonal to the direction of the X-axis and the direction of the Y-axis. The direction of the Z-axis is also referred to as an upper and lower direction. The direction of the X-axis and the direction of the Y-axis each are also referred to as a horizontal direction.

The mount 11 is, for example, arranged on an vibration isolation table 3 so that external vibrations are inhibited from being transmitted to the stage 12 and the imaging unit 15 on the mount 11. The stage 12 is arranged on the mount 11. The stage 12 is mounted with the measuring object W. The stage 12 is provided movable in the direction of the Y-axis to the mount 11 due to a Y-axis driving mechanism not illustrated.

Supporting portions 13a and 13b are provided to both side portions of the mount 11. The respective supporting portions 13a and 13b are provided so as to extend upward from the side portions of the mount 11. The X-axis guide 14 is provided on the supporting portions 13a and 13b so as to be astride the portions. The X-axis guide 14 includes the imaging unit 15 mounted.

The imaging unit 15 is provided movable in the direction of the X-axis along the X-axis guide 14 due to an X-axis driving mechanism not illustrated, and is provided movable in the direction of the Z-axis due to a Z-axis driving mechanism not illustrated. The relative positional relationship between the object W on the stage 12 and the imaging unit 15, along the X-axis, the Y-axis, and the Z-axis, can be set due to the driving mechanisms. That is, the positional relationship is adjusted so that an imaging area of the imaging unit 15 can correspond to a measuring region of the object W.

The imaging unit 15 is provided, in a removable manner, with an image optical head 151 that images a two-dimensional image of the object W and a light interference optical head 152 that measures a three-dimensional shape of the object W through light interference measurement. The imaging unit 15 measures the object, at a measurement position set by the computer system 20, using either head.

The measurement field of view of the image optical head 151 is typically set wider than the measurement field of view of the light interference optical head 152, and both of the heads can be used, being switched due to the control of the computer system 20. The image optical head 151 and the light interference optical head 152 are supported by a common supporting plate so as to retain a certain positioned relationship, and are previously calibrated in order to prevent measurement coordinate axes from varying before and after the switching.

The image optical head 151 includes an image pickup element (e.g., a CCD camera or a CMOS camera), an illuminating device, and a focusing mechanism, and captures the two-dimensional image of the object W. The computer system 20 captures data of the two-dimensional image that has been captured.

The light interference optical head 152 measures the shape of the object W, for example, due to white-light interferometry. According to the present embodiment, the light interference optical head 152 is an exemplary measurement head. The details of the light interference optical head 152 will be described later.

The computer system 20 includes a computer body 201, a keyboard 202, a joystick 203, a mouse 204, and a display 205. The computer body 201 controls, for example, the operation of the apparatus body 10. The computer body 201 controls the operation of the apparatus body 10 with a circuit (hardware), such as a control board, and a program (software) executed by a CPU. The computer body 201 operates information on the object W, based on a signal output from the apparatus body 10, and displays an operation result on the display 205.

The joystick 203 is used in setting a position at which the image of the object W is captured. That is, a user operates the joystick 203 so that the relative positional relationship between the object W and the imaging unit 15 varies and the position of the imaging area displayed on the display 205 can be adjusted.

Figure 2:
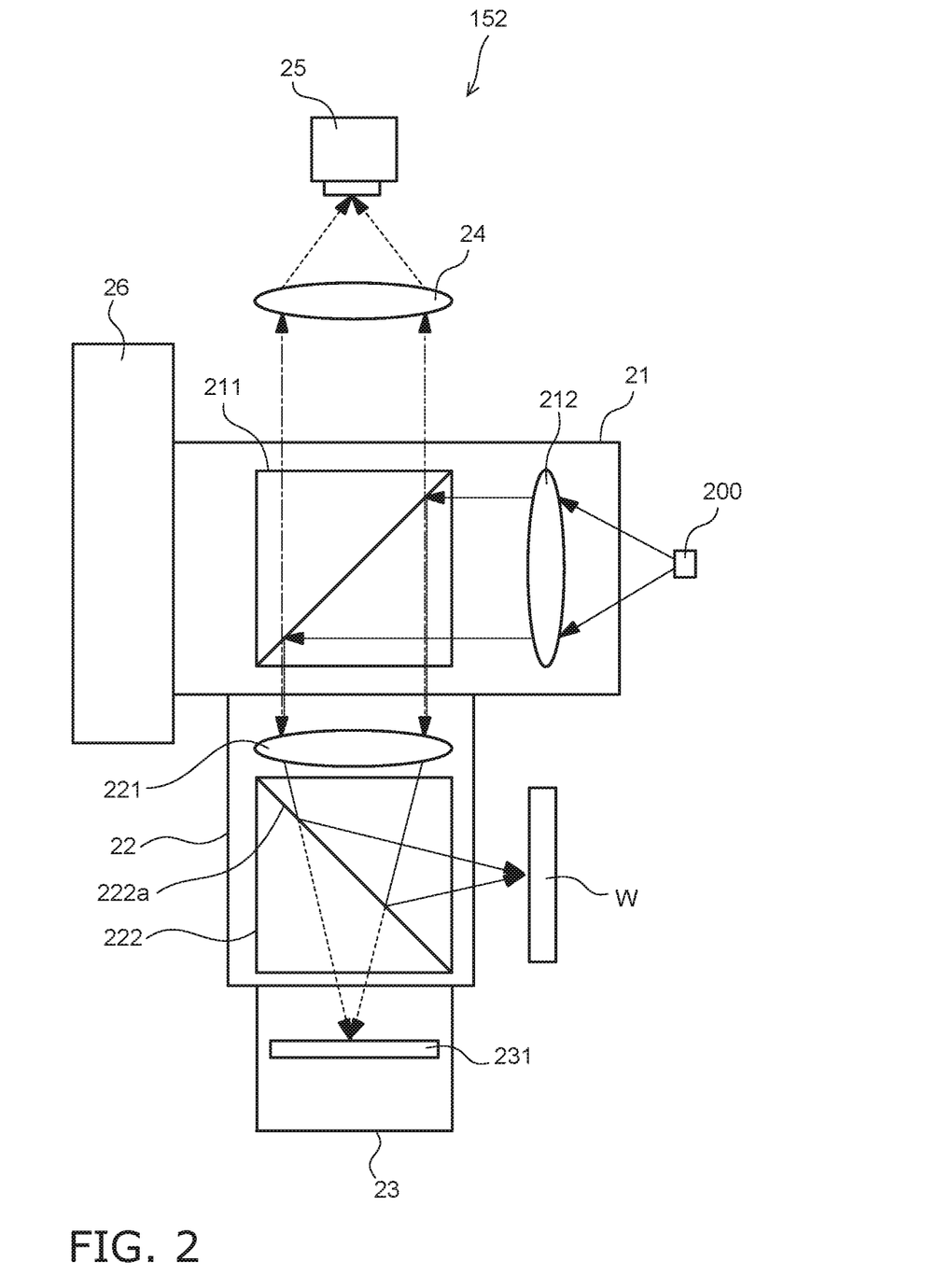
FIG. 2 is a schematic view exemplifying a configuration of a light interference optical head.

FIG. 2 is a schematic view exemplifying a configuration of the light interference optical head.

As illustrated in FIG. 2, the light interference optical head 152 includes a light emitting unit 200, a light interference optical head unit 21, an objective lens unit 22, a reference mirror unit 23, an image-forming lens 24, an imaging unit 25, and a driving mechanism unit 26.

The light emitting unit 200 includes a light source that outputs low coherence broadband light having a number of wavelength components over a broadband. A white light source, such as a halogen lamp or a light emitting diode (an LED), is used as the light emitting unit 200.

The light interference optical head unit 21 includes a beam splitter 211 and a collimator lens 212. The light emitted from the light emitting unit 200 is delivered in a collimated manner to the beam splitter 211 via the collimator lens 212, from a direction perpendicular to the optical axis of the objective lens unit 22. From the beam splitter 211, light is output along such optical axis and the collimated beam is delivered from above to the objective lens unit 22.

The objective lens unit 22 includes, for example, an objective lens 221 and a beam splitter 222. When the collimated beam is incident on the objective lens 221 in the objective lens unit 22 from the upper side, the incident light becomes convergent light due to the objective lens 221, and the convergent light is incident on a reflection plane 222a inside the beam splitter 222. Here, the incident light is divided into transmitted light (reference light) that travels in a reference optical path (a broken line in the figure) having a reference mirror 231, and reflected light (measurement light) that travels in a measurement optical path (a solid line in the figure) including the object W arranged. The transmitted light converges, is reflected from the reference mirror 231, and further is transmitted through the reflection plane 222a of the beam splitter 222. Meanwhile, the reflected light converges, is reflected from the object W, and is reflected from the reflection plane 222a of the beam splitter 222. The reflected light from the reference mirror 231 and the reflected light from the object W are composited by the reflection plane 222a of the beam splitter 222 so as to be a composite wave.

The composite wave composited at a position of the reflection plane 222a of the beam splitter 222, becomes a collimated beam due to the objective lens 221. Then, the collimated beam travels upward and is incident on the image-forming lens 24 after passing through the light interference optical head unit 21 (a dot-and-dash line in FIG. 2). The image-forming lens 24 focuses the composite wave so as to form an interference image on the imaging unit 25.

The reference mirror unit 23 retains the reference mirror 231 that reflects the transmitted light (the reference light) that has been branched by the beam splitter 222 and travels in the reference optical path. When the object W is the inner wall of the cylinder, a face of the inner wall is arranged substantially vertical to the stage 12. Accordingly, the convergent light due to the objective lens 221 is orthogonally reflected by the beam splitter 222 (in the horizontal direction), and then the face of the inner wall of the cylinder vertically arranged is irradiated with the measurement light.

The imaging unit 25 is, for example, a CCD camera including a two-dimensional image pickup element for constituting an image pickup means, and captures up the interference image of the composite wave (the reflected light from the object W and the reflected light from the reference mirror 231) output from the objective lens unit 22. The computer system 20 captures data of the image that has been captured.

Figure 3:
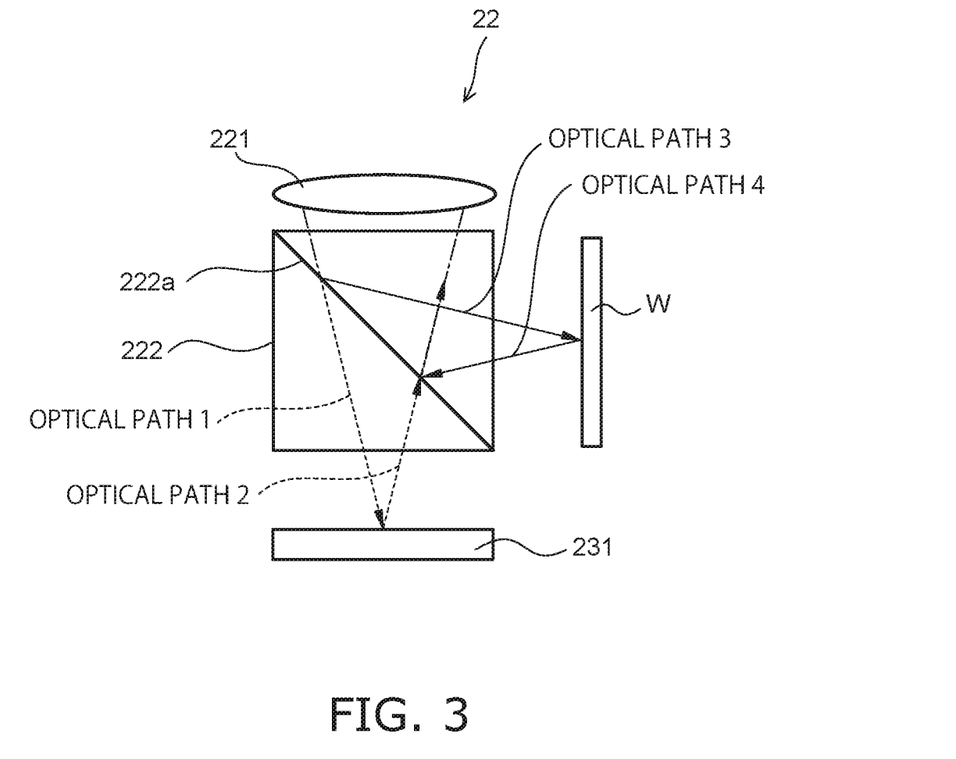
FIG. 3 is an enlarged view of a main portion of an objective lens portion.

The driving mechanism unit 26 moves the light interference optical head 152 in a direction of the optical axis in accordance with a command for movement, from the computer system 20. Here, in an enlarged view of a main portion of the objective lens unit 22 illustrated in FIG. 3, when the optical path length of the reference optical path (an optical path 1+an optical path 2) and the optical path length of the measurement optical path (an optical path 3+an optical path 4) are equivalent to each other, the optical path length difference becomes zero. Therefore, the driving mechanism unit 26 horizontally moves the light interference optical head 152 in a direction of the optical axis of a beam reflected by the beam splitter 222 so as to adjust the length of the measurement optical path in order to acquire an optical path length difference of zero, in the measurement. Note that, a case where the light interference optical head 152 is moved, has been exemplarily described above, but a configuration in which the length of the measurement optical path is adjusted by moving the stage 12, may be provided. In this manner, the optical path length of any one of the reference optical path and the measurement optical path is variable in the light interference optical head 152. Note that, when a measurement surface of the object W is arranged in the horizontal direction, an optical system that transmits the measurement light in a vertical direction by inverting the transmission of the reference light and the reflection of the measurement light due to the beam splitter 222, may be applied.

The imaging unit 25 repeatedly captures images with the position of the light interference optical head 152 in the direction of the optical axis, being moved and scanned by the driving mechanism unit 26, under the control of the computer system 20. The computer system 20 captures image data of the interference image captured by the imaging unit 25 at each moving and scanning position. A moving and scanning position at which a peak of interference fringes occurs, is detected at each position in the measurement field of view so that the height of the measurement surface of the object W is acquired at each of the positions.

Figure 4A:
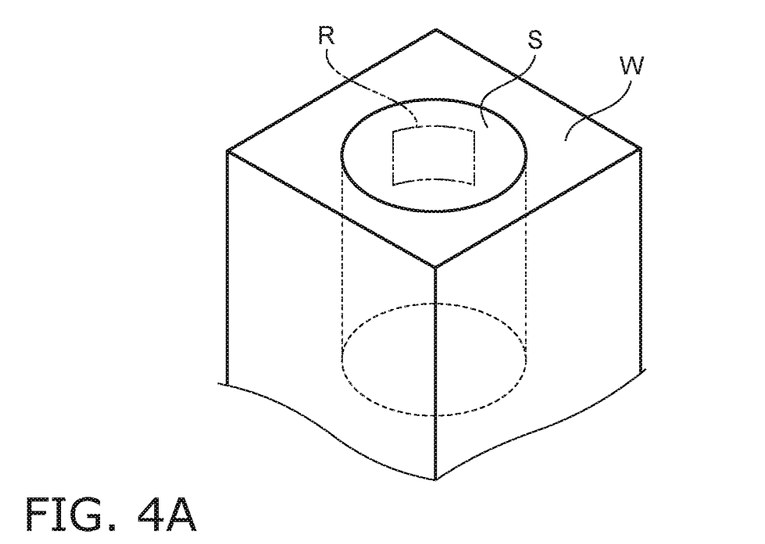
FIG. 4A is a schematic perspective view exemplifying an object W having a curved shape.
Figure 4B:
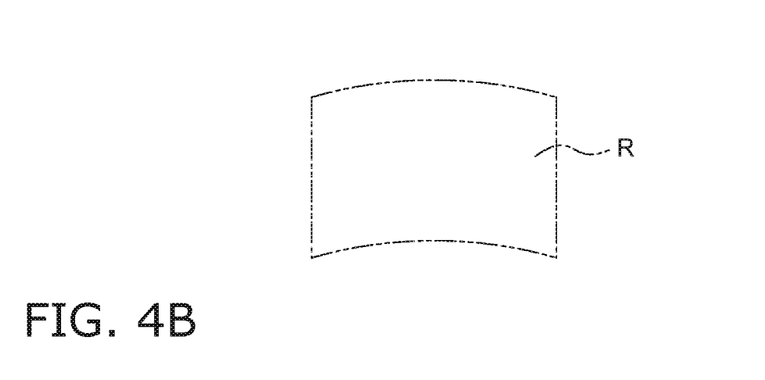
FIG. 4B is a schematic view exemplifying a measuring region.
Figure 4C:
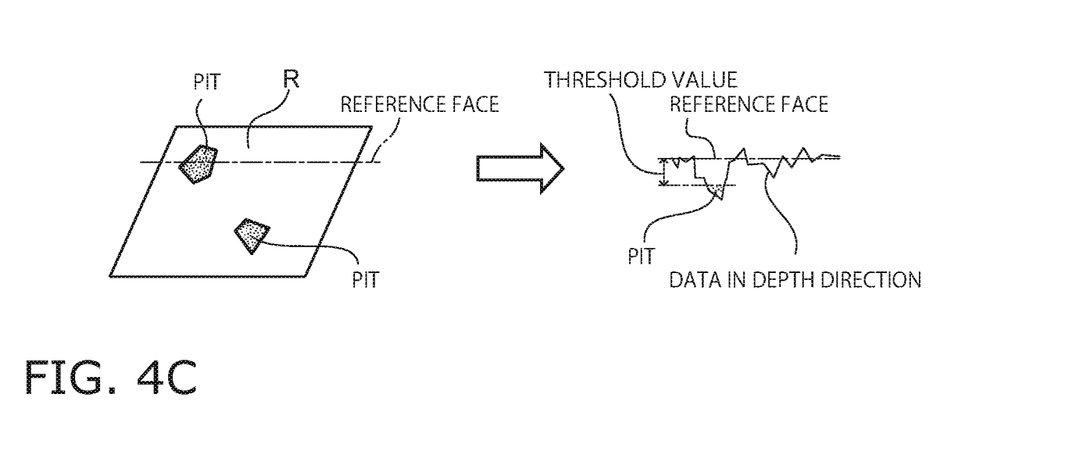
FIG. 4C is a schematic view exemplifying three-dimensional data and a section.

FIGS. 4A to 4C are schematic views for describing the object W and a measuring region R.

FIG. 4A is a schematic perspective view exemplifying the object W having a curved shape. FIG. 4B is a schematic view exemplifying the measuring region R. FIG. 4C is a schematic view exemplifying three-dimensional data and a section.

According to the present embodiment, the shape of the object W having the curved shape, such as an inner wall of a cylinder, illustrated in FIG. 4A, is measured. The light interference optical head 152 measures a distance in a direction vertical to the face of the inner wall S with a predetermined region of the face of the inner wall S as the measuring region R. FIG. 4B schematically illustrates the one measuring region R.

As illustrated in FIG. 4C, the three-dimensional data of the face of the inner wall S includes data of the distance in the direction vertical to the face of the inner wall S (a depth direction) for each pixel of the imaging unit 25 corresponding to the measuring region R. When the face of the inner wall S includes, for example, a pit (a recess) thereon, the data has a value lower than that of a reference face. When the data is lower than a threshold value, the presence of the pit is determined.

(Measurement Method and Measurement Program)

A measurement method according to the present embodiment measures a surface of the object W illustrated in FIG. 4A with the image measurement apparatus 1 described above.

The measurement method has the following processes.

(1) A process of setting a measurement condition suitable for the measurement of a first region of the object W, (2) A process of acquiring a first measurement result by measuring a first scanning range of the surface of the object W with a first scanning pitch, (3) A process of determining a second region of the object W, (4) A process of setting a measurement condition suitable for the measurement of the second region, (5) A process of acquiring a second measurement result by measuring a second scanning range with a second scanning pitch, and (6) A process of compositing data.

For example, the computer system 20 of the image measurement apparatus 1, or a program executed by a computer that has captured the three-dimensional data acquired by the apparatus body 10 (a measurement program), performs each of the processes (1) to (6). The computer may be included in the computer system 20.

Figure 5:
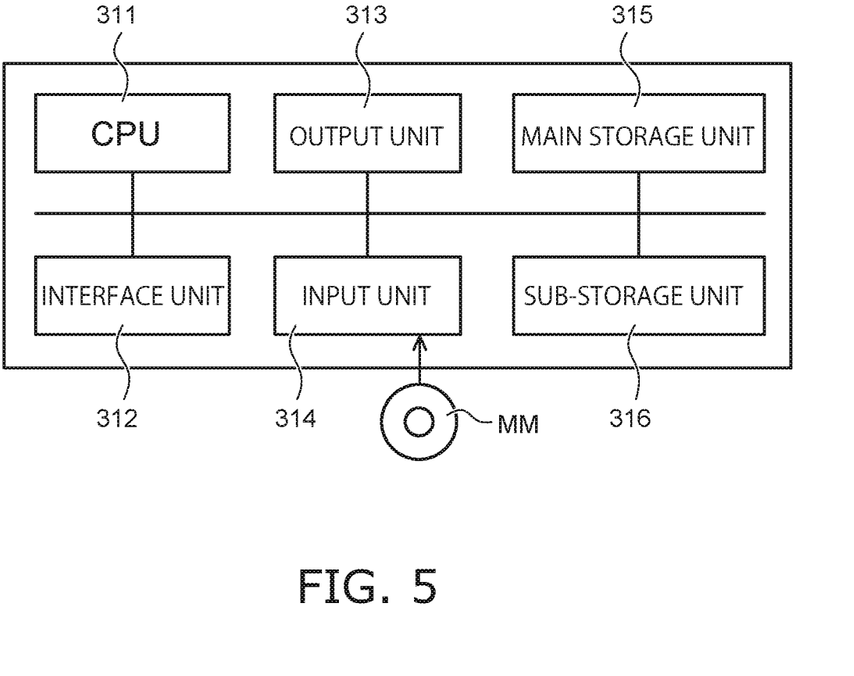
FIG. 5 is a block diagram exemplifying a configuration of a computer.

FIG. 5 is a block diagram exemplifying a configuration of the computer. The computer includes a central processing unit (CPU) 311, an interface unit 312, an output unit 313, an input unit 314, a main storage unit 315, and a sub-storage unit 316.

The CPU 311 controls each of the units by executing various programs. The interface unit 312 inputs and outputs information with respect to external equipment. According to the present embodiment, the computer captures information transmitted from the apparatus body 10, through the interface unit 312. The computer transmits information to the apparatus body 1 through the interface unit 312. The interface unit 312 couples the computer to a local area network (LAN) or a wide area network (WAN).

The output unit 313 outputs a result processed by the computer. For example, the display 205 illustrated in FIG. 1 and a printer are used as the output unit 313. The input unit 314 receives information from the user. For example, a keyboard and a mouse are used as the input unit 314. The input unit 314 includes a function of reading information stored in a recording medium MM.

For example, a random access memory (RAM) is used as the main storage unit 315. The sub-storage unit 316 may be partially used as a part of the main storage unit 315. For example, a hard disk drive (HDD) and a solid state drive (SSD) are used as the sub-storage unit 316. The sub-storage unit 316 may be an external storage device coupled through a network.

Figure 6:
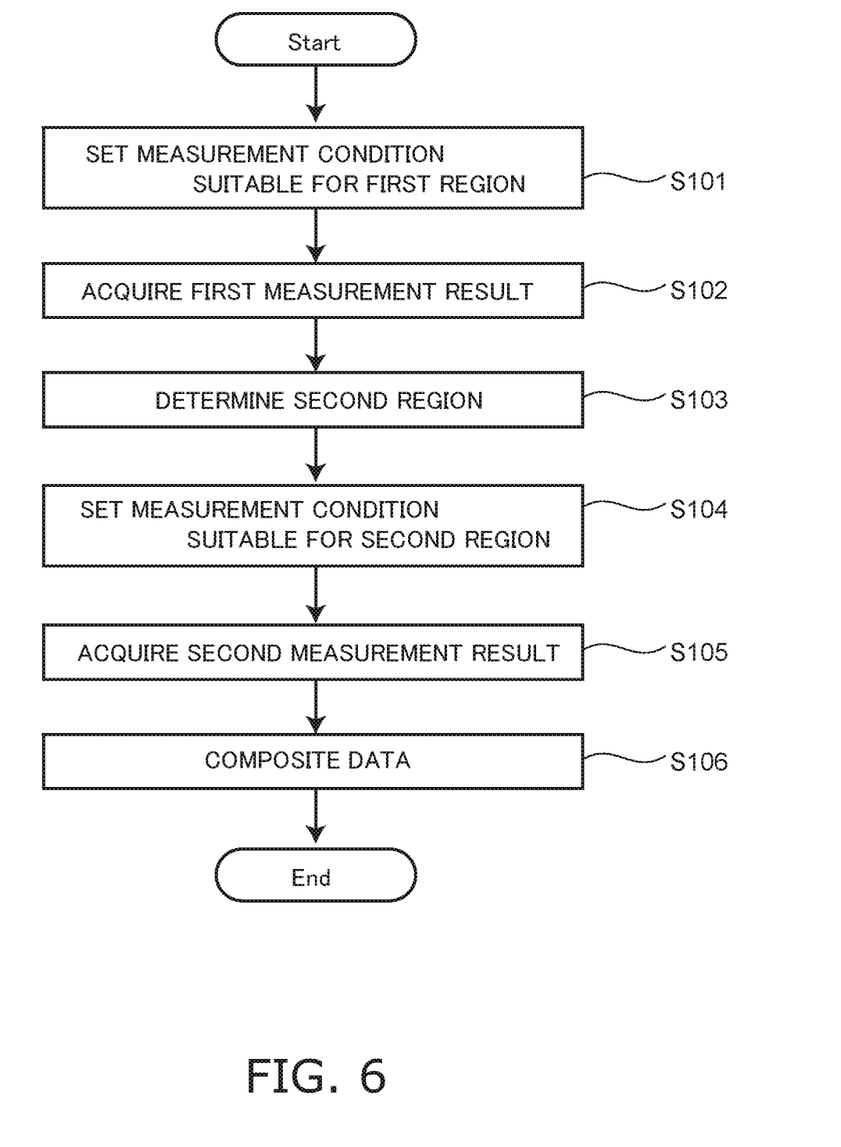
FIG. 6 is a flow chart exemplifying a flow of a measurement program according to the present embodiment.

FIG. 6 is a flow chart exemplifying a flow of the measurement program according to the present embodiment.

The measurement program according to the present embodiment, causes the computer to function as means corresponding to the processes (1) to (6). Pieces of processing at steps S101 to S106 illustrated in FIG. 6 correspond to the processes (1) to (6).

Figure 7A:
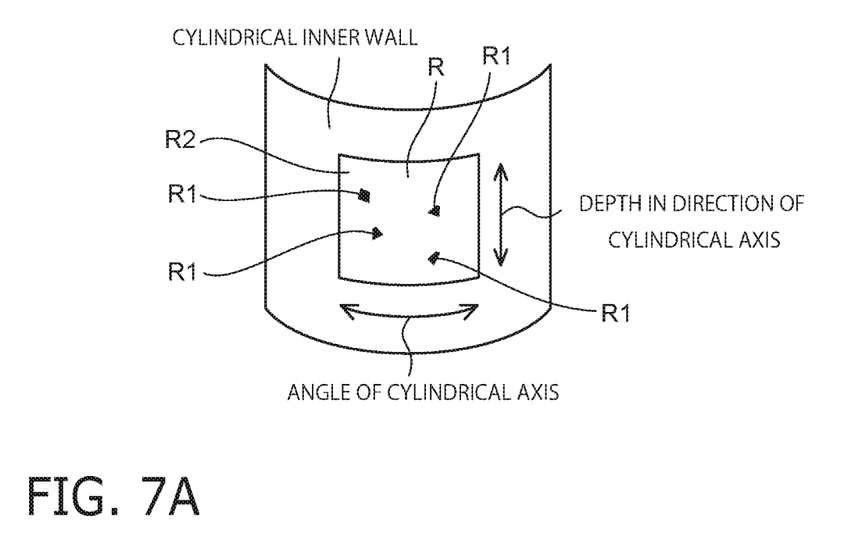
FIG. 7A is a schematic view of a measuring region R of a cylindrical inner wall.

First, as illustrated at step S101, the measurement condition suitable for the measurement of the first region of the object W is set. FIG. 7A schematically illustrates the measuring region R of the cylindrical inner wall. The angle of a cylindrical axis and the position of a depth in a direction at the cylindrical axis are specified so that the measuring region R of the cylindrical inner wall is set. A region including a recess (a pit) on the cylindrical inner wall is the first region R1, and a region except that is the second region R2. At step S101, the measurement condition suitable for the measurement of the first region R1, namely, a measurement condition suitable (e.g., the light intensity) to the measurement of the recess (the pit) is set. For example, the threshold value of the depth of the pit is set as a setting for the threshold value of concave and convex of the cylindrical inner wall.

Figure 7B:
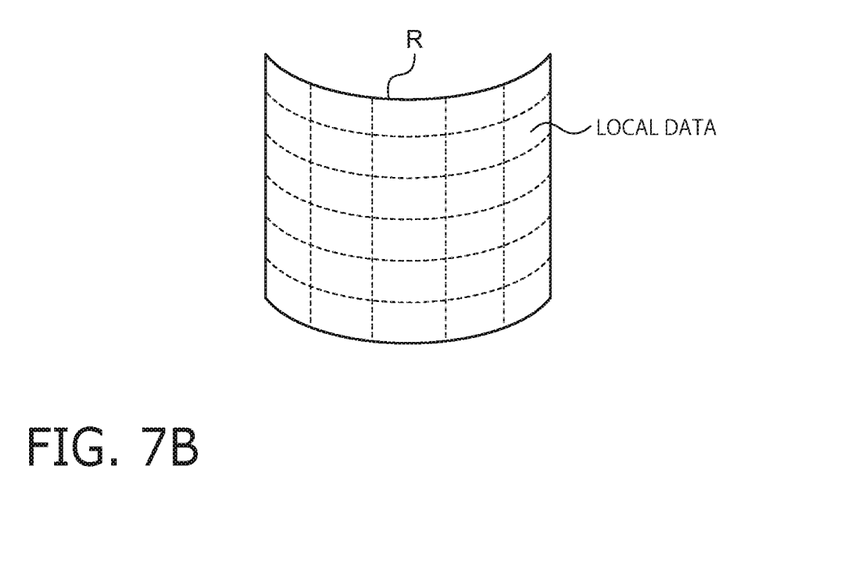
FIG. 7B is a schematic view of the correspondence between the measuring region R and at least two pieces of local data on the cylindrical inner wall.

Note that, when the measuring region R exceeds a scanning range that can be measured by scanning once with the measurement head. (e.g., the light interference optical head 152), measurement positions of pieces of local data are determined in order to cover the entirety of the measuring region R. FIG. 7B schematically illustrates the correspondence between the measuring region R and the pieces of local data on the cylindrical inner wall.

Next, as illustrated at step S102, the first measurement result is acquired. That is, the first scanning range of the surface of the object W is measured with the first scanning pitch under the condition, suitable for the measurement of the first region R1, that has been previously set. When the object W is the cylindrical inner wall, the measurement head (e.g., the light interference optical head 152) scans the measuring region R so as to acquire the first measurement result. This scanning is referred to as "first scanning".

Figure 8A:
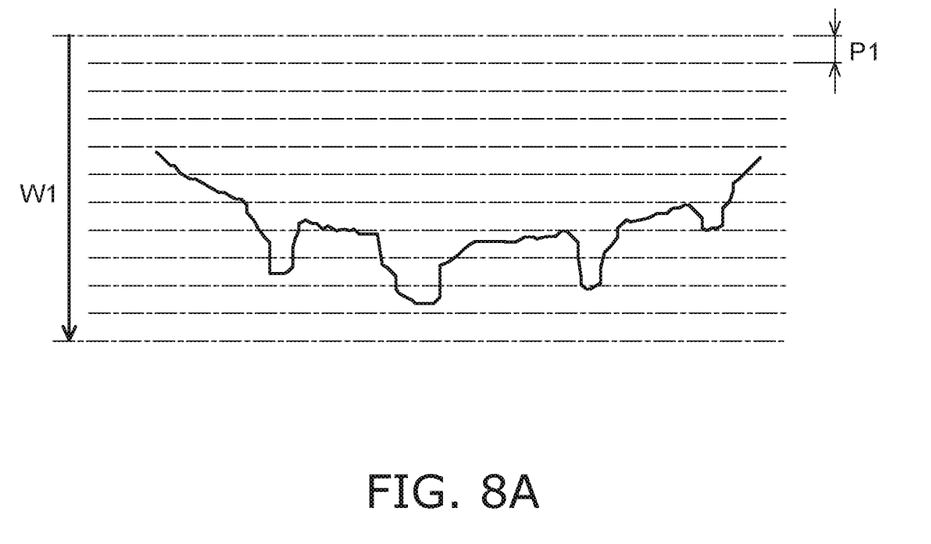
FIGS. 8A and 8B are schematic views exemplifying first scanning and region determination, respectively.

Here, a scanning range of the first scanning is a moving range of the distance between the object W and the measurement head (the distance in the optical axis, also referred to as the depth) in the measurement. The scanning pitch of the first scanning is the interval of a variation of the distance between the object W and the measurement head in the measurement. For example, as illustrated in FIG. 8A, when the object W is the cylindrical inner wall, a range slightly larger than the entire depth of the curved cylindrical inner wall in a measuring region, is set as the first scanning range W1. An approximate pitch with which at least the shape of the recess can be acquired, is set as the first scanning pitch P1. When an image is captured with keeping a shutter of the imaging unit 25 open in the first scanning, a blur of the image easily occurs because of high-speed scanning. Thus, the image is preferably captured with both of the shutter speed and the light intensity increased. The shutter speed and the light intensity are automatically set due to program manipulation, in the first scanning. The first scanning range W1 is measured with the first scanning pitch P1 under the set measurement condition so that the first measurement result is acquired.

Figure 8B:
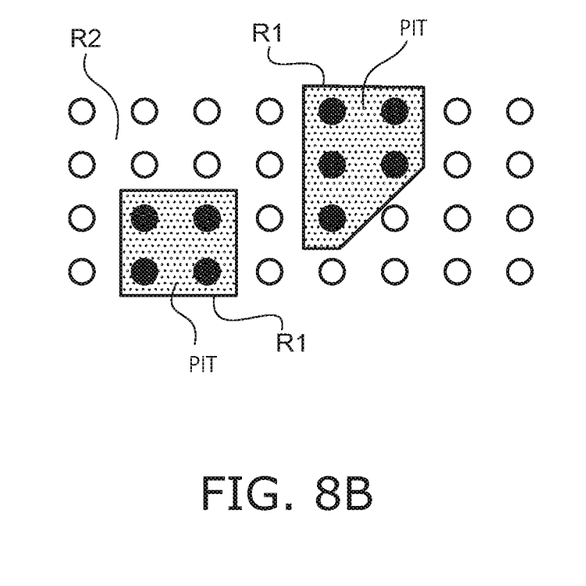

Next, as illustrated at step S103, the second region is determined. The first region R1 is acquired with the first measurement result and then the region except the first region R1 is acquired as the second region R2 in order to determine the second region R2. When the first region R1 includes the recess (the pit), as illustrated in FIG. 8B, the data exceeding the threshold value (the threshold value of the concave and convex set at step S101) in the first measurement result, is the region including the recess (the pit) (the first region R1).

Specifically, a region enclosed in a direction of the surface (a region including points exceeding the threshold value, successive in the direction of the surface) is determined to be the pit, in the points having the data exceeding the threshold value, from the average value in the first measurement result (black dots in the figure). The region determined as the pit the first region R1 and the region except the first region R1 is the second region R2.

Figure 9A:
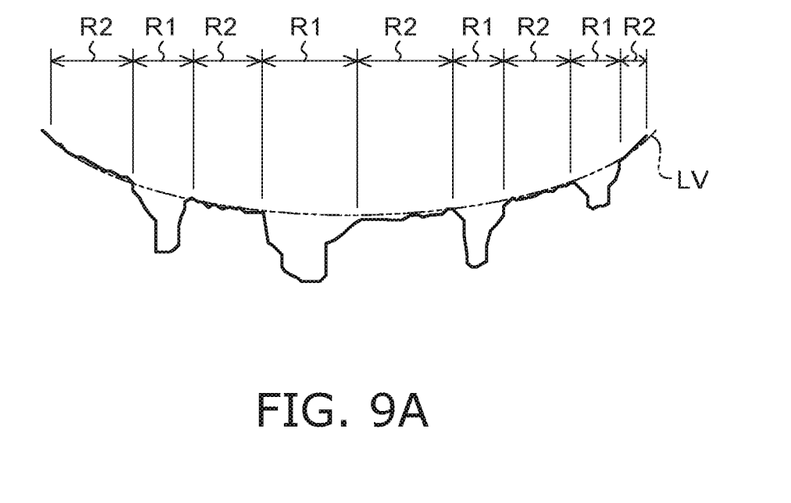
FIGS. 9A and 9B are schematic views exemplifying the region determination and second scanning, respectively.

Here, in acquiring the second region R2, the data exceeding the threshold value, may be removed from the average value of the first measurement result in the direction of the cylindrical axis (refer to FIG. 7A). A value including the remaining data averaged in the direction of the cylindrical axis (refer to FIG. 7A) may be assumed as a surface reference position. Then, a region of the data exceeding the threshold value from the surface reference position, may be the first region R1 and a region except that may be the second region R2. FIG. 9A exemplifies the surface reference position LV, the first region R1 and the second region R2 acquired with the surface reference position LV. The surface reference position LV is a reference depth assumed as a surface of the face of the inner wall, and is indicated as a straight line in the direction of the cylindrical axis, as a curve in a direction of a cylindrical circumference, and as a curved surface in the measuring region R. The surface reference position LV may be fit to a polynomial curve (a curved surface). The surface reference position LV may be acquired by calculation based on a design value of the diameter of the cylinder. When the curved shape in the measuring region of the object W is sufficiently smooth (the diameter of the cylinder is sufficiently large), the measuring region R may be approximated as a plane.

Next, as illustrated at step S104, the measurement condition suitable for the measurement of the second region R2 is set. When the object W is the cylindrical inner wall including the recess (the pit), a surface portion of the cylindrical inner wall is the second region R2. Therefore, a measurement condition suitable for the measurement of the surface portion of the cylindrical inner wall (e.g., the light intensity), is set.

Next, as illustrated at step S105, the second measurement result is acquired. That is, the second scanning range of the surface of the object W is measured with the second scanning pitch under the condition suitable for the measurement of the second region R2 that has been previously set. This scanning is referred to as "second scanning".

Figure 9B:
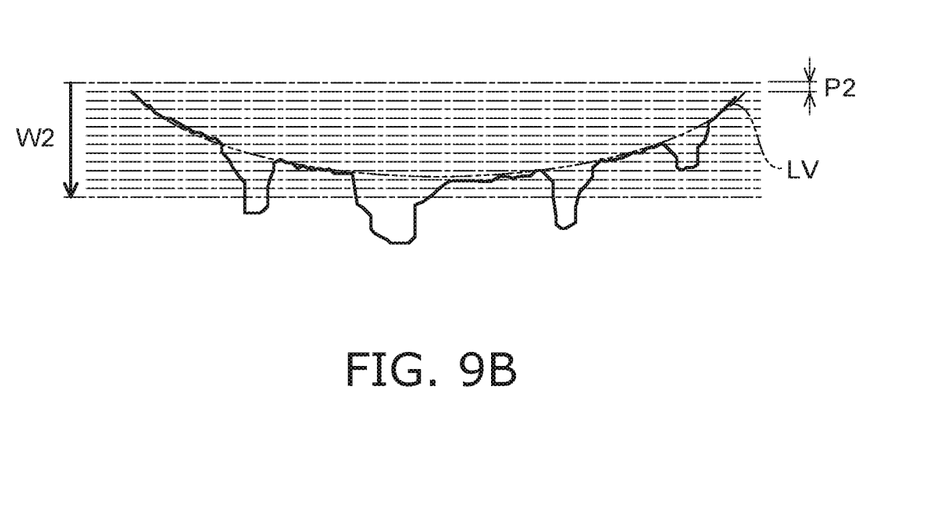

FIG. 9B exemplifies the second scanning range W2 and the second scanning pitch P2 in the second scanning. The second scanning range W2 in the second scanning is narrower than the first scanning range W1 in the first scanning. The second scanning pitch P2 in the second scanning is finer than the first scanning pitch P1 in the first scanning.

According to the present embodiment, a range including the surface reference position LV and excluding at least a bottom of the recess recessed lower than a lowest position of the surface reference position LV, is set as the second scanning range W2. In other words, a range slightly wider than the entire depth of the surface reference position LV curved in the measuring region, is set as the second scanning range W2. Accordingly, the second scanning range W2 includes the surface reference position LV, but excludes at least the recess recessed lower than the deepest (lowest) position of the surface reference position LV, from the measuring region.

As the second scanning pitch P2, the shape of the surface portion of the cylindrical inner wall being the second region R2, is set finer than the first scanning pitch P1 so that fine data is acquired. Accordingly, a range in which the fine data is required, can be effectively set. Note that, an image can be captured with keeping the shutter of the imaging unit 25 open, in the second scanning. The shutter speed and the light intensity are automatically set due to program manipulation, in the second scanning.

Next, as illustrated at step S106, the data composition is performed. Here, the data of the first region R1 in the first measurement result and the data of the second region R2 in the second measurement result are composited. The composition reflects the data acquired under the condition suitable for the measurement of the first region R1 or the first region R1, and the data acquired under the condition suitable for the measurement of the second region R2 for the second region R2, as a measurement result of the measuring region R.

According to the measurement method and the measurement program, the first measurement result suitable for the measurement of the first region R1, can be acquired in a short time by scanning a wide range coarsely, and the second measurement result suitable for the measurement of the second region R2, can be acquired during time no longer than necessary for acquiring high-precision data by scanning a narrow range finely. Therefore, when the surface of the object W including regions having a different optimum measurement condition is measured, the shape can be measured in a short time by even scanning twice.

For example, when the object W is, for example, an "engine bore", measurement accuracy in the order of micrometers, is required for the width and the depth of a frontage of a recess (a pit), whereas measurement accuracy in the order of nanometers is required for the roughness of surface properties. When conventional multi-scanning measurement is applied to the object W, a measurement range in which the entire shape can be covered (practically, a range slightly larger than the entire shape) is set with a measurement pitch corresponding to preciseness necessary for resolution highest to all the measurement, and additionally a three-dimensional shape composited with each of the light intensity suitable for the surface and the light intensity suitable for the measurement of the inside of the recess (the pit), is required to be generated. When the wide range is measured with the high resolution, a long time is required.

Meanwhile, according to the present embodiment, with the focus of the difference in preciseness required for the measurement, the initial scanning (the first scanning) in multi-scanning, measures the entire region being an measuring object with a coarse pitch at a high speed (rough scanning). Based on the result thereof, a position at which minute measurement is required, and a range of the measurement, are estimated. Then, minute scanning (fine scanning) is performed in the next scanning (the second scanning), and the three-dimensional shape thereof is composited so that the measurement of the entire measuring region R can be accelerated.

When the object W is the engine bore, the first scanning range W1 is approximately 100 μm and the first scanning pitch P1 is approximately 80 to 100 nm. The second scanning range W2 is approximately 10 to 20 μm and the second scanning pitch P2 is approximately 60 nm. By applying the present embodiment, it is possible to reduced measurement time by several days in comparison to the conventional multi-scanning measurement.

Here, the measurement program according to the present embodiment described above, may be stored in the computer-readable recording medium MM. That is, a part of steps S101 to S106 illustrated in FIG. 6 or the entirety may be stored in the recording medium MM in a computer-readable format. The measurement program according to the present embodiment may be distributed through a network.

Note that, the present embodiment has been described above, but the present invention is not limited to the embodiment. For example, the light interference optical head 152 with the white-light interferometry is used as the measurement head, but an image probe or a laser probe can be also applied. Points from focus (PFF) that acquires the three-dimensional shape of the object W by detecting a peak in contrast of each pixel of a CCD from images successively acquired with the image optical head 151, as the measurement head, scanning in the direction of the optical axis of the light with which the object W is irradiated, can be also applied.

Though the cylindrical inner wall having the recess (the pit) has been exemplified for the object W to be measured, for example, the present embodiment is effective for even the object W including a step on the surface, the step including a lower portion and a higher portion having a different measurement condition. For example, the present embodiment is effective for the object W being a face of an inner wall of a cylinder, the face having cross-hatching (grooves in a mesh pattern) formed by honing processing.

Furthermore, according to the above embodiment, the data of the first region R1 and the data of the second region R2 are composited by (6) the process of composting the data (the processing at step S106 in FIG. 6). When only any one piece of the data of the first region R1 and the data of the second region R2 is required, the one piece of the data may be output without the composition.

The scope of the present invention also includes additions, deletions, and design alterations of the constituent elements appropriately made with respect to the embodiment described above by a person skilled in the art, and an appropriately combination of the features of the embodiment, as far as the spirit of the present invention is included.

What is claimed is:

1. A method of measuring a shape of an object based on reflected light from a surface of the object irradiated with light from a measurement head, the measurement method comprising:
    setting, by a processor, a first measurement condition suitable for measurement of a first region of the object;
    measuring, by irradiating light at a first intensity by the measurement head, a first scanning range of the surface with a first scanning pitch;
    acquiring, by the processor, a first measurement result based on the first measurement condition and the measuring of the first scanning range;
    determining, by the processor, a second region of the surface from the first measurement result;
    setting, by the processor, a second measurement condition suitable for measurement of the second region;
    measuring, by irradiating light at a second intensity by the measurement head, a second scanning range of the surface narrower than the first scanning range with a second scanning pitch finer than the first scanning pitch;
    acquiring, by the processor, a second measurement result based on the second measurement condition and the measuring of the second scanning range; and
    compositing, by the processor, data of the first region acquired from the first measurement result together with data of the second region acquired from the second measurement result,
    wherein the first intensity is higher than the second intensity, and
    wherein a shutter speed of an imaging device during the measuring of the first scanning range is faster than a shutter speed of the imaging device during the measuring of the second scanning range.

2. The measurement method according to claim 1, wherein the determining of the second region includes estimating a surface reference position based on measurement data of only the second region from the first measurement result, and
    the acquiring of the second measurement result includes setting the second scanning range including the surface reference position.

3. The measurement method according to claim 1, wherein the first region has a recess recessed with respect to the surface.

4. The measurement method according to claim 3, wherein the determining of the second region includes estimating a surface reference position based on measurement data of only the second region from the first measurement result, and
    the acquiring of the second measurement result includes setting the second scanning range including the surface reference position, the second scanning range excluding at least a bottom of the recess recessed lower than a lowest position of the surface reference position.

5. The measurement method according to claim 1, wherein the measurement head acquires the first measurement result and the second measurement result due to light interferometry.

6. The measurement method according to claim 1, wherein the second region is a region of the surface not including the first region.

7. A non-transitory computer-readable recording medium that stores a measurement program for measuring a shape of an object based on reflected light from a surface of the object irradiated with light from a measurement head, when executed by a computer causes the computer to:
    set a first measurement condition suitable for measurement of a first region of the object;
    cause, the measurement head to irradiate light at a first intensity, for measuring a first scanning range of the surface with a first scanning pitch;
    acquire a first measurement result based on the first measurement condition and the measuring of the first scanning range;
    determine a second region of the surface from the first measurement result;
    set a second measurement condition suitable for measurement of the determined second region;
    cause, the measurement head to irradiate light at a second intensity, for a second scanning range of the surface narrower than the first scanning range with a second scanning pitch finer than the first scanning pitch;
    acquire a second measurement result based on the second measurement condition and the measuring of the second scanning range; and
    compositing, by the processor, data of the first region acquired from the first measurement result together with data of the second region acquired from the second measurement result, wherein the first intensity is higher than the second intensity, and wherein a shutter speed of an imaging device during the measuring of the first scanning range is faster than a shutter speed of the imaging device during the measuring of the second scanning range.

* * * * *